United States Patent [19]
Kayatz

[11] 3,892,044
[45] July 1, 1975

[54] METHOD AND APPARATUS FOR COOLING

[75] Inventor: Karl-Heinz Kayatz, Hamburg-Nienstedten, Germany

[73] Assignee: Claudius Peters AG, Hamburg, Germany

[22] Filed: Feb. 13, 1974

[21] Appl. No.: 442,253

[30] Foreign Application Priority Data
Feb. 14, 1973 Germany............................ 2307165

[52] U.S. Cl................. 34/20; 34/57 C; 34/164; 34/203; 209/467; 432/58
[51] Int. Cl............................................... F26b 7/00
[58] Field of Search............ 34/62, 63, 64, 57 R, 9, 34/20, 164, 174, 203, 57 C, 57 A; 209/44, 321, 467; 432/58; 165/104

[56] References Cited
UNITED STATES PATENTS

| | | | |
|---|---|---|---|
| 1,866,951 | 7/1932 | Soulary............................... | 209/467 |
| 2,014,249 | 9/1935 | Fletcher............................... | 34/164 |
| 3,444,996 | 5/1969 | Douglas et al....................... | 209/467 |
| 3,686,773 | 8/1972 | Schreiner............................. | 34/203 |
| 3,704,525 | 12/1972 | Devel................................. | 34/164 |

*Primary Examiner*—Kenneth W. Sprague
*Assistant Examiner*—James C. Yeung
*Attorney, Agent, or Firm*—Sherman & Shalloway

[57] ABSTRACT

Cooling of mixed fine- and coarse-granular material, such as cement clinker, by classifying the material in an upper, mechanically-agitated cooling zone and collecting the fines in a lower, fluidizing bed, the cooling air successively being introduced as the fluidizing medium; counter-current contacting and cooling; the fine material falling from the upper zone; contacting and cooling the coarser material in the upper cooling zone, and thereafter being used as preheated or secondary air in the process from which the granular material is to be cooled.

10 Claims, 3 Drawing Figures

3,892,044

METHOD AND APPARATUS FOR COOLING

BACKGROUND OF THE INVENTION

The cooling of mixtures of both coarse and fine granular material presents distinct problems. This is particularly true in the cooling of cement clinker, in which case, the process economy requires the recovery of heat by use of the heated air, from the cooling steps, as secondary air in the cement burning process.

The supply of such secondary air to cement kilns must be accomplished in carefully controlled amounts, without waste and at a uniform rate. Variations in the rate of secondary sir input, or of its heat content, result in imbalances of the burning process, which imbalances can only be accommodated with great difficulty.

Prior attempts in sufficient mixed coarse and fine granular materials, such as cement clinker discharging from a rotary kiln, have encountered a particular problem regarding dust. Where sufficient cooling air or gas is presented, fine particles are entrained in the secondary air and must be removed.

In some cases, sufficent dust may be carried into the kiln to "blind" or obscure optical systems observing the kiln interior, such as pyrometers or televsion monitoring systems. In any case, such dust adds to the installation and operating costs since it must be removed from the air before it is ultimately discharged to the atmosphere.

Additionally, the presence of such "dust" has an adverse effect on the heat transfer in prior coolers, since local areas of such fines tend to divert air flow to the more open or more permeable zones of the material bed, thereby causing non-uniform air flow and unequal cooling rates throughout the bed. The resulting "hot spots" are unsatisfactory in terms of product quality and damaging to the cooling apparatus, particularly because of the insufficiency of cooling air flow at the hot spot.

Prior attempts at such cooling have included grate coolers using pushing grates, reciprocating grates, moving grates or vibrating grates. Typically, such coolers establish a generally flat or slightly sloping quiescent bed of the material to be cooled, and pass the cooling gas or air transversely through the bed. Such coolers are prone to the problems discussed hereinbefore and also to excessive wear as a result of the fine dust.

Fluidizing coolers establish a fluidized bed of material above a permeable deck. However, such coolers are effective only with relatively fine materials. Cement clinker often runs in size from less than 1 mm to 50 mm, or even larger on occasion. Oversize particles (larger than that maximum capable of being supported by the velocity of the gas traversing the bed) will simply accumulate in the fluidized bed, ultimately destroying the bed and requiring cleanout.

None of the prior coolers have been found to be entirely satisfactory for cooling mixtures of both coarse and fine granular material.

SUMMARY OF THE INVENTION

In general, the preferred method of the present invention includes the steps of classifying the mixed coarse and fine granular material into an upper, mechanically-advanced bed of coarse material and a lower, fluidized bed of finer material, passing a cooling gas sequentially as a fluidizing and cooling medium in the fluidized bed, then upward in countercurrent exchange with fine particles descending to the fluidized bed, then in cross-flow exchange through the mechanically-advanced bed, and into the burning zone from which the hot material is received.

In general, the preferred form of cooler includes a first cooling zone including at least one material-screening grate, means for agitating the screening grate to advance coarse material therealong while passing fine materials downwardly therethrough, a countercurrent exchange chamber below said screening grate, a fluidizing deck positioned to receive fine material from said countercurrent exchange chamber, and means for passing a cooling gas serially through said fluidizing deck, said countercurrent chamber and said screening grate.

The screening grate may be arranged in two consecutive zones and have an intermediate breaker to reduce oversize lumps, preferably with the downstream screening grate being positioned stepwise at a lower elevation than the upstream screening grate.

BRIEF DESCRIPTION OF THE DRAWINGS

A better understanding of the invention may be derived from the following description and accompanying drawings in which.

DETAILED DESCRIPTION OF THE PREFERRED EMBODIMENT

Figure 1:
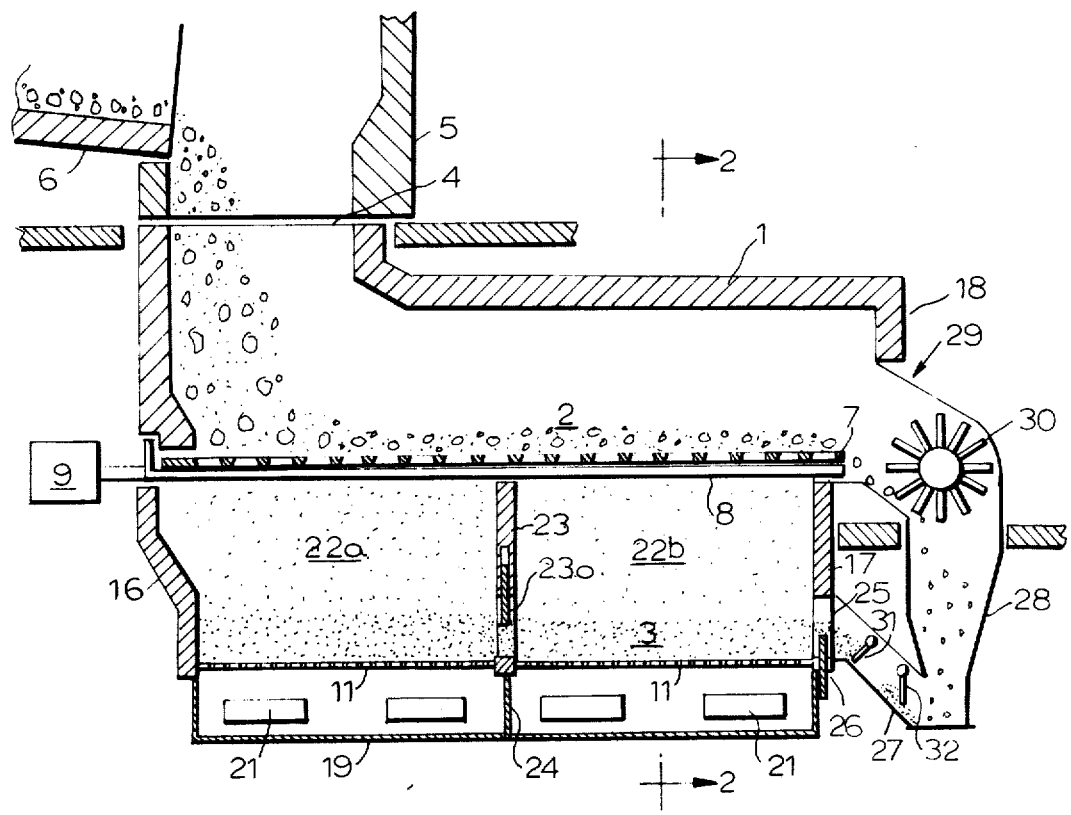
FIG. 1 is a schematic side view of the preferred form of the invention.
Figure 2:
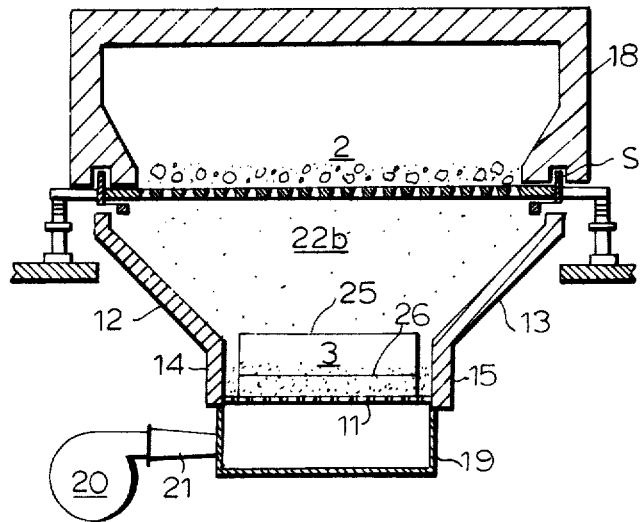
FIG. 2 is a cross-sectional view of the installation of FIG. 1 and taken along lines 2—2 of FIG. 1.

As shown in FIGS. 1 and 2, the preferred form of the invention comprises a cooler 1 having an upper level 2 and a lower level 3. The upper level 2 receives a mixture of coarse and fine granular material via an inlet 4 associated with the discharge hood 5 of a rotary kiln 6.

Underlying the upper level 2, a screening grate 7 is mounted on a frame 8 for mechanical agitation such as a vibrating means 9. It is to be understood that the particular form of mechanical agitation of the screening grate 7 is not critical. The screening grate 7 may also take any suitable form including the single grate shown, multiple reciprocating grates or any form compatible with the type of mechanical agitation employed to advance the material on the grate. Also, if desired, the screening grate may be slightly sloped (for example, about 5°) in the direction of material travel.

The screening grate 7 includes a plurality of apertures 10 which preferably take the form of slits aligned longitudinally with the direction of advance of the bed of material. Also, it is preferred that the apertures 10 are tapered to flare downwardly and outwardly, as best shown in FIG. 2, so that they are self-cleaining.

Underlying the lower level 3, a thermally stable fluidizing deck 11 forms the support for the finer material which falls through the screening grate 7. The fluidizing deck 11 may be formed of any suitable material such as porous ceramic tiles or the perforate plate shown, but is to be capable of passing gas upwardly therethrough without permitting passage of the fine solids through itself.

The space between the upper level 2 and the narrower lower level 3 is enclosed by sloping side walls 12 and 13, which have vertical portions 14 and 15, respectively, closing against and along the fluidizing deck 11, as well as a pair of end walls 16 and 17.

The insulated walls 12, 13, 16 and 17 close against the insulated upper portion 18 of the cooler housing, by means of any suitable gas seal, such as the seal 5 shown schematically in FIG. 2.

The fluidizing deck 11 has a plenum chamber 19 thereunder which receives cooling gas or air from one or more fans 20 via the several inlets 21.

The structure thus defines a fluidized bed zone, at the lower level 3, and an upwardly widening countercurrent chamber 22 between the fluidized bed zone and the screening grate 7. The countercurrent chamber 22 is divided, close to its midpoint, into first and second subchambers 22a and 22b, respectively, by a transverse wall 23 having an adjustable underflow gate 23a in the zone of the fluidized bed. The plenum chamber is similarly divided by a wall 24 aligned with the wall 23.

The endwall 17 has a discharge aperture 25 therein which includes an adjustable overflow weir 26. The discharge aperture 25 receives a branch duct 27 of an outlet chute 28 which communicates with the discharge 29 of the upper level 2. A clinker breaker 30 is positioned at the discharge of the upper level to break oversize clinker and project such pieces back onto the upper level for further cooling.

The branch duct 27 has a discharge valve therein in the form of two alternately opening and closing trap doors 31 and 32 which permit discharge of the fines from the fluidized bed while maintaining an air lock against the escape or flow of air from the countercurrent chamber 22b to the discharge duct 28. Other forms of airlock feeders may be employed, if desired.

OPERATION OF THE PREFERRED EMBODIMENT

In operation of the cooler of FIGS. 1 and 2, cooling air is delivered to the plenum chamber 19 by the fans 20 and passes sequentially through the fluidizing deck 11; decelerate upwardly through the widening countercurrent chambers 22a and 22b; through the screening grate 7, and then through the hood 5 into the kiln as secondary air.

Simultaneously, the mixed stream of coarse and fine granular material is received from the kiln via the inlet 4, and falls onto the screening grate 7. The motion of the screening grate permits the fines (for example, minus 8 mm particles) to pass to and through the apertures 10 to fall through the countercurrent chambers 22a or 22b to collect as a relatively deep, fluidized bed on the fluidizing deck 11. The coarser material remains as a relatively thinner bed on the screening grate 7 for cooling by the air passing therethrough and to be conveyed to the discharge 29 by the conveying effect of the grate 7.

The fluidized bed of finer material collects to a level generally controlled by the overflow weir 26. The underflow gate acts as an air seal between the counterflow chambers 22a and 22b, since those chambers may be maintained at different pressures to provide a higher rate of gas flow through the chamber 22a to treat the hottest material, having the higher percentage of fines as it is received from the kiln, since the layer's permeability increases as the fines are screened out to the lower level. Such differential air flow may be achieved by varying the air delivery from the fans 20.

Therefore, it is apparent that the present invention provides for differential cooling of coarse and fine granular materials by the steps in the sequence of an intimate heat exchange of air with the fines in a fluidized bed, then a relatively quiet, countercurrent exchange in the widened countercurrent chamber and, finally, cross-flow heat exchange across a non-fluidized, classifying bed of material as the bed is being advanced to discharge.

Not only do the coarse and fines thus experience the optimum form of cooling contact, but their rate of passage through the system may also be regulated according to their rate of cooling, which is directly related to their size. In addition, the breaker 30 breaks and recycles the more slowly-cooled, oversize particles for additional cooling over the screening grate 7.

DESCRIPTION OF MODIFIED EMBODIMENT

Figure 3:
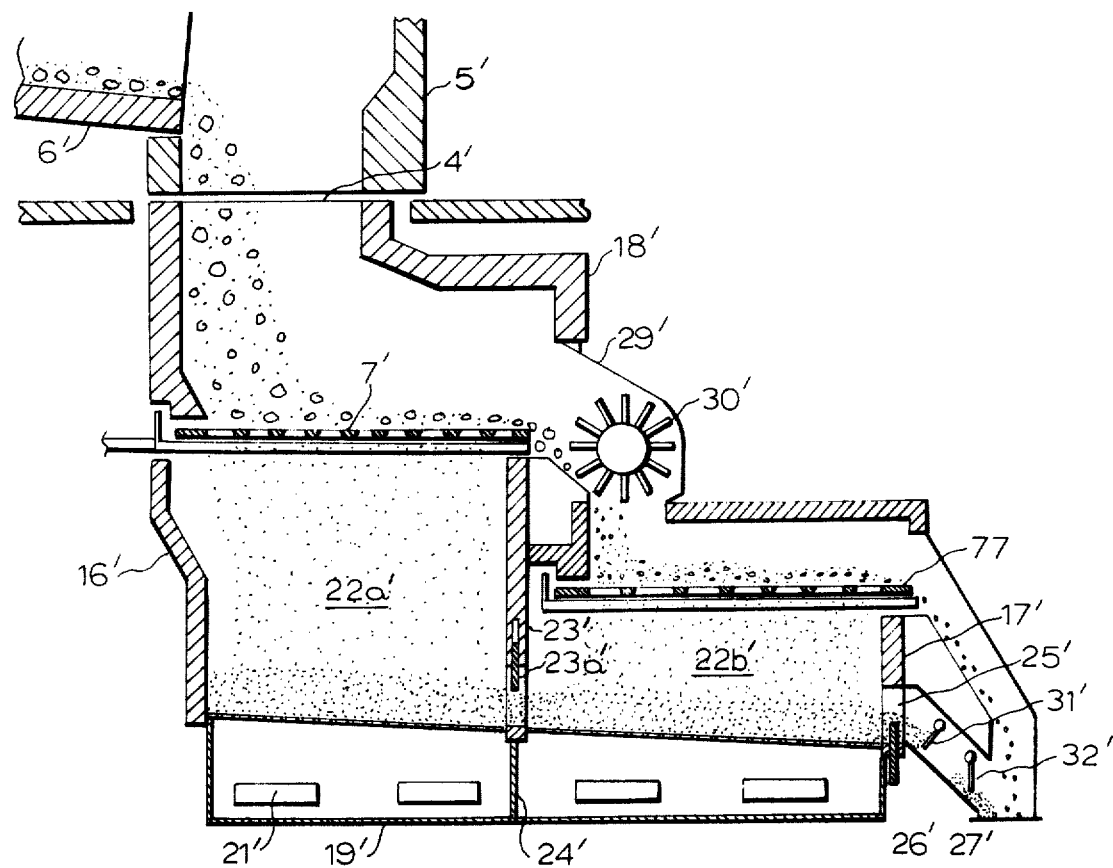
FIG. 3 is a schematic side view of a modified form of the invention.

A modified form of the invention is shown in FIG. 3, in which the same numerals, primed, are used to denote elements similar to those of FIGS. 1 and 2.

As shown in FIG. 3, the screening grate is arranged as a first section 7' overlying the countercurrent chamber 22a' and a second section 77, which may be separately driven, if desired, overlying the countercurrent chamber 22b' and at a lower elevation than the first section 7'.

With the difference in elevation between the grate sections 7' and 77, the clinker breaker, preferably air cooled, is located between the first and second grate sections, thereby encountering oversize particles earlier in their travel through the cooler to permit better final cooling of the resulting broken particles.

It is also important in the cooler of FIG. 3 that the increased height of the countercurrent chamber 22a' permits a greater countercurrent drop of the hottest material, and a correspondingly greater time for countercurrent heat exchange.

Various changes may be made in the details of the invention as disclosed without sacrificing the advantages thereof or departing from the scope of the appended claims.

What is claimed is:

1. A method for cooling mixed coarse and fine granular solids from a burning process comprising
   a. classifying the mixed solids in a bed in an upper zone;
   b. collecting the finer of the classified solids in a fluidized bed at a lower zone;
   c. passing a cooling gas first through said fluidized bed;
   d. subsequently passing said cooling gas from said fluidized bed in countercurrent heat exchange with the fines being passed from the classifying step toward the fluidized bed;
   e. thereafter passing the cooling gas from the countercurrent exchange step in cross-flow through said classifying bed, and
   f. introducing said cooling gas from said cross-flow step to the burning process as preheated gases.

2. The method of claim 1 in which the mixed coarse and fine granular material is cement clinker and the cooling gas is air.

3. Apparatus for cooling mixed coarse and fine granular material including
   a. a screening conveyor,
   b. a fluidizing deck positioned vertically spaced from and underlying at least a portion of said screening conveyor to form c. a countercurrent chamber therebetween, and d. gas flow means for passing a cooling gas sequentially through said fluidizing deck, said countercurrent chamber and said screening conveyor.

4. The cooler of claim 3 in which the screening conveyor includes plural sections.

5. The cooler of claim 3 in which a breaker is provided at the discharge of the screening conveyor.

6. The cooler of claim 4 in which the screening conveyor includes first and second sections, the second section is positioned lower than the first section, and a breaker is positioned at the discharge of the first section.

7. The cooler of claim 3 in which the fluidizing deck is smaller in area than the screening conveyor, and said gas flow means includes an upward and outward divergence of said counter-flow chamber to effect a fluidizing velocity of said cooling gas through said fluidizing deck and a non-fluidizing cross-flow velocity through said screening conveyor.

8. The cooler of claim 7 in which the gas flow means includes means dividing the flow of gas into two vertical streams, and means for transferring fluidized material between said two vertical streams.

9. The cooler of claim 8 in which said dividing means includes a transverse partition in said countercurrent chamber, said transverse partition having a material transfer gate at said fluidized bed.

10. The cooler of claim 9 in which the gas flow means includes a plenum chamber, said plenum chamber being subdivided to supply said two vertical streams of cooling gas.

* * * * *